(12) United States Patent
Pearson

(10) Patent No.: US 6,196,469 B1
(45) Date of Patent: Mar. 6, 2001

(54) ENERGY RECYCLING AIR HANDLING SYSTEM

(76) Inventor: Frederick J Pearson, 903 Dulaney Valley Ct. Apt. #3, Towson, MD (US) 21204

(*) Notice: Subject to any disclaimer, the term of this patent is extended or adjusted under 35 U.S.C. 154(b) by 0 days.

(21) Appl. No.: 09/362,042

(22) Filed: Jul. 28, 1999

(51) Int. Cl.$^7$ ........................................... F24F 7/00
(52) U.S. Cl. ........................ 236/49.3; 62/94; 62/178; 62/238.3; 62/408; 165/8; 165/217; 236/1 B
(58) Field of Search ................... 236/49.3, 1 B; 62/94, 177, 178, 238.3, 271, 408; 165/6, 8, 212, 217

(56) References Cited

U.S. PATENT DOCUMENTS

| | | |
|---|---|---|
| 3,861,459 | 1/1975 | Koop . |
| 3,889,742 * | 6/1975 | Rush et al. ................... 165/7 |
| 4,014,380 * | 3/1977 | Rush et al. ................... 165/2 |
| 4,093,435 | 6/1978 | Marron et al. . |
| 4,113,004 * | 9/1978 | Rush et al. ................... 165/3 |
| 4,180,126 * | 12/1979 | Rush et al. ................... 165/59 |
| 4,180,985 * | 1/1980 | Northrup, Jr. ................ 62/94 |
| 4,594,860 | 6/1986 | Coellner et al. . |
| 4,769,053 | 9/1988 | Fischer, Jr. . |
| 5,069,272 * | 12/1991 | Chagnot ....................... 165/8 |
| 5,183,098 | 2/1993 | Chagnot . |
| 5,279,609 * | 1/1994 | Meckler ..................... 236/49.3 |
| 5,285,842 | 2/1994 | Chagnot . |
| 5,325,676 | 7/1994 | Meckler . |
| 5,542,968 | 8/1996 | Belding et al. . |
| 5,548,970 | 8/1996 | Cunningham, Jr. . |
| 5,732,562 * | 3/1998 | Moratalla ...................... 62/94 |
| 5,761,915 * | 3/1999 | Rao .............................. 62/94 |
| 5,782,104 * | 7/1998 | Sami et al. .................. 62/271 |
| 5,887,784 * | 3/1999 | Haas ........................... 236/44 A |

* cited by examiner

Primary Examiner—Corrine McDermott
Assistant Examiner—Marc Norman
(74) Attorney, Agent, or Firm—Harold Gell

(57) ABSTRACT

An air handling system including at least one terminal unit for maintaining a serviced volume at a predetermined temperature with constant or variable volume control wherein a thermal energy wheel provides heat transfer between the outgoing and inflowing air streams provided by the air handling system via the terminal unit. The heat transfer between air streams is regulated as a function of air velocity and temperature differentials as measured at various points in system which are related specifically to the serviced volume. The regulation is exercised by controlling the angular velocity of the means for transferring thermal energy.

18 Claims, 3 Drawing Sheets

ENERGY RECYCLING AIR HANDLING SYSTEM

BACKGROUND OF THE INVENTION

FIELD OF THE INVENTION

This invention relates to the use of energy wheels to recycle thermal energy in air handling systems and more particularly to systems including an energy wheel heat recovery system in which the heat recovery energy wheel is selectively employed when heat is transferred, to or from exhaust air and/or inlet air, is desired to meet constant or variable volume requirements coincident with constant temperature requirements.

DISCUSSION OF THE RELATED ART

Wheels for transferring thermal energy are old and well known as independent thermal energy transfer systems. An example of a typical thermal energy wheel is found in U.S. Pat. No. 4,093,435. In that patent, paper webs and corrugated aluminum are wound to form a wheel carrying salts such as ammonium sulfide and diammonium phosphate. The wheel is rotated between a supply air duct and an exhaust air duct to provide heat exchange functions between the two air flows.

Another example of a thermal energy wheel is found in U.S. Pat. No. 4,594,860 which teaches the concept of utilizing a wheel fabricated from layers of absorbent material wound about a hub. In this system, an air supply blower forces an air stream through one section of the energy wheel and an exhaust blower directs a stream of exhaust air through another section and thermal energy is transferred between the two air flows.

A more recent development in thermal energy wheels is found in the U.S. Pat. No. 5,542,968 were a wheel formed from a fibrous support is charged with finely powdered desiccant material capable of absorbing sensible heat from a warm air stream and releasing it into a cool air stream.

Historically, thermal energy wheels have been employed in stand-alone systems. A few attempts have been made to integrate them into air handling systems, but the resultant designs have proven to be prohibitively large and far too expensive to meet the demands of environments such as hospitals where individual rooms may have different air handling requirements.

An example of such a system may be found in U.S. Pat. No. 5,548,970 for "Air Handling System" issued to R. Cunningham, Jr., et al, on Aug. 27, 1996. That system provides an air handling system including a heat recovery energy wheel and blowers and dampers for controlling air flow. The energy wheel is a desiccant wheel movable into and out of the air stream to selectively recover heat from exhaust air and transfer it to inflowing outside air. It is designed to meet standards requiring the addition of outside air but it fails to adequately provide a means for constant volume, constant temperature air handling as required in various environments such as hospitals.

In hospitals, the problem is more complex because individual rooms have individual air handling requirements specifying constant or variable volume and constant temperature. Historically this individual room requirement problem has been solved by combining hot water, steam or electrical reheaters and controllable vents to modify conditioned air provided by a central system. Constant-volume reheat units have been in use to modify conditioned air for selected rooms for approximately 40 years and variable-volume reheat units have been known for 25 years. The systems have met the needs of industry but at a prohibitive cost in wasted energy. Such systems expend large amounts of energy to cool the air and then spend additional energy to heat the conditioned air for selected rooms.

OBJECTIVES OF THE INVENTION

A primary objective of the present invention is to provide a thermal energy wheel adapted to replace reheaters in constant-volume and variable-volume terminal units of an air handling system.

Another objective is to provide an energy wheel heat recovery system in which an energy wheel remains in the flow stream of the inlet and exhaust air and the heat recovery system is selectively operated by varying the angular velocity of the wheel.

Another object is to provide a heat recovery system employing an energy wheel in which the wheel is rotated through the inlet and exhaust air at an angular velocity dictated by the thermal requirements of a room serviced by a terminal unit of an air handling system.

Other objects, features and advantages of this invention will be apparent from the drawings, specification and claims which follow.

SUMMARY OF THE INVENTION

To overcome the energy extravagance of reheaters commonly employed in air handling systems serving a plurality of individual rooms having different temperature requirements with constant or variable volume specifications, the present invention provides a variable speed energy wheel to transfer thermal energy between the inlet and outlet air flows of a terminal unit and thereby control the temperature while maintaining constant or variable volume protocols.

DESCRIPTION OF THE PREFERRED EMBODIMENT

Figure 1:
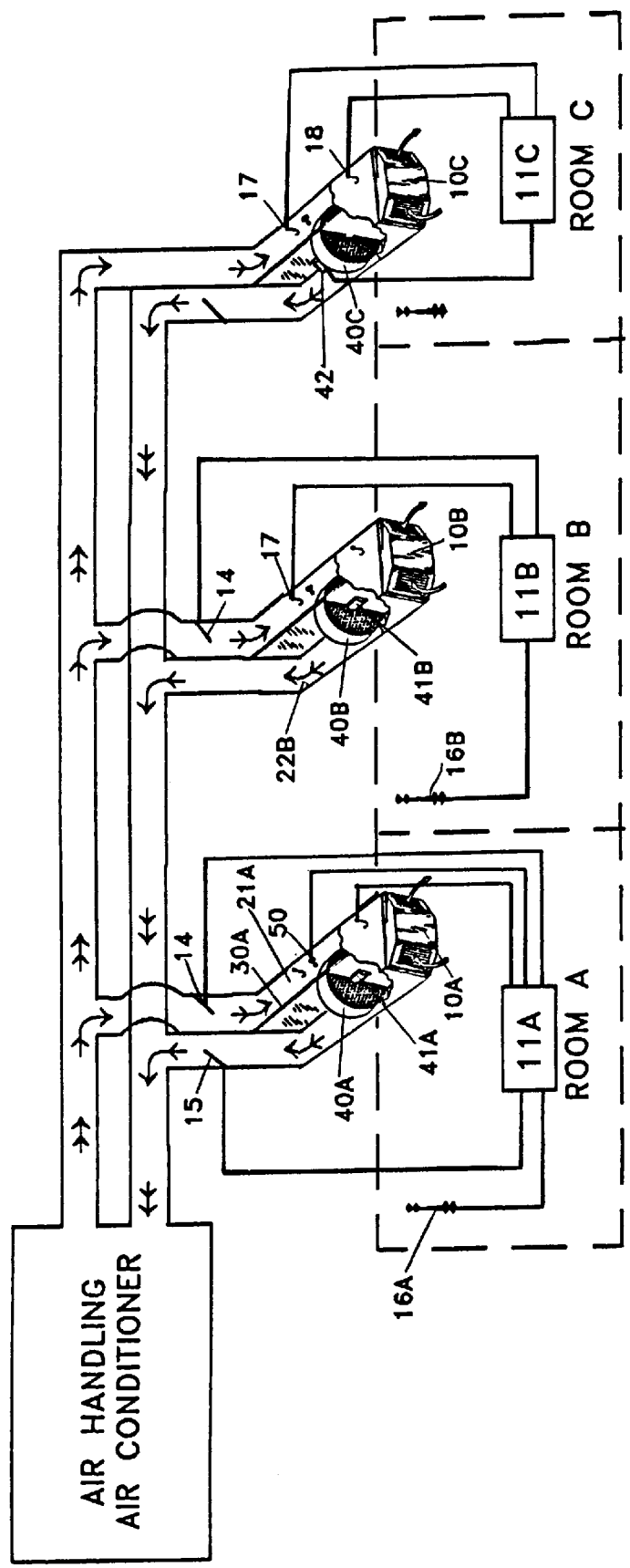
FIG. 1 is a schematic representation of an air handling system incorporating a plurality of terminal units incorporating the present invention.

A typical air handling unit providing conditioned air to a plurality of rooms is illustrated in FIG. 1. The rooms, A, B and C, each have a different temperature and constant volume or variable volume requirement. In the prior art systems, the input temperature to all room terminal units must be at least as low as that required to serve the room having the lowest temperature requirement (the greatest cooling load). This causes the air conditioner to work much harder than would be needed to meet the average demands of the building because it must provide an output great enough to keep every room in the building at approximately the temperature required by the coolest room. To meet varying temperature requirements for different rooms, existing systems rely on reheaters. For instance, if all three rooms in FIG. 1 must have their air exchanged every two hours and room A must be maintained at 72 degrees, room B must be maintained at 78 degrees and room C must be maintained at 74 degrees, heaters are used in the terminal units for rooms B and C to raise the inlet temperature as required for each of these warmer rooms. This is a significant waste of energy. Not only does the air conditioning system have to work much harder than required for the actual demands of the building, the cool air has to be reheated for most rooms, doubling the wasted energy. However, in the system of the present invention, thermal energy wheels replace the reheaters. In the foregoing scenario, energy wheel 40A is stationary and has no effect on the temperature entering the room via duct 21A, energy wheel 40B rotates at a speed which will result in a thermal energy transfer between the outlet duct 22B and inlet duct 21B that will keep room B at 78 degrees and energy wheel 40C rotates at a speed less than energy wheel 40B but fast enough to insure a thermal energy transfer between exhaust duct 22C and 21C that will result in room C being maintained at the proper temperature.

Figure 2:
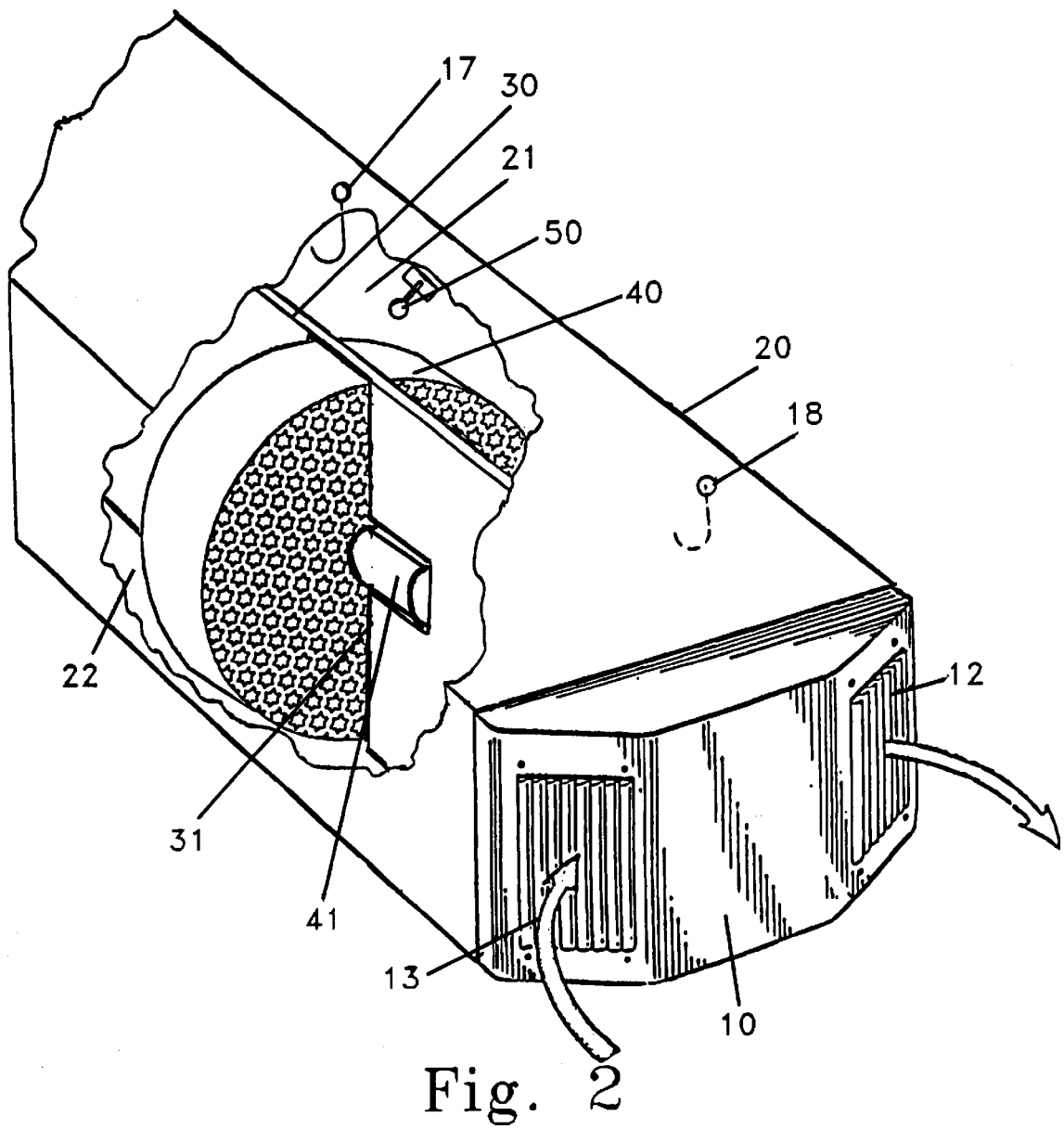
FIG. 2 is a simplified line drawing of an exemplary embodiment of the invention installed in the bifurcated duct of one of the terminal units of FIG. 1 connecting a room to an air handling system.

FIG. 2 illustrates one of the terminal units for a room in a building serviced by an air handling system such as illustrated in FIG. 1. The terminal unit includes an inlet and outlet grill assembly 10 which controls the air flow into the room from the bifurcated duct 20. The duct is connected to the conditioned air supply of the air handling system for the building. It is bifurcated by wall 30 which divides the duct into two channels, channel 21 which provides conditioned air to the serviced room and channel 22 which returns air from the serviced room to the air handling system primary air conditioner. An energy wheel 40 is centered in the duct in an opening 31 in the wall bifurcating the duct so that approximately half of the wheel occupies the inlet air channel, supply duct 21, and the other half of the wheel occupies the return air channel, return duct 22. To simplify the terminology used throughout this patent, channels 21 and 22 will be referred to as supply duct 21 and return duct 22.

The energy wheel provides a thermal energy transfer between the return and supply ducts. The amount of thermal transfer is a function of the angular velocity of the energy wheel, the rotational speed, the temperature difference between the supply and return ducts and velocity of the air flow or unit volume of air per time period.

Figure 3:
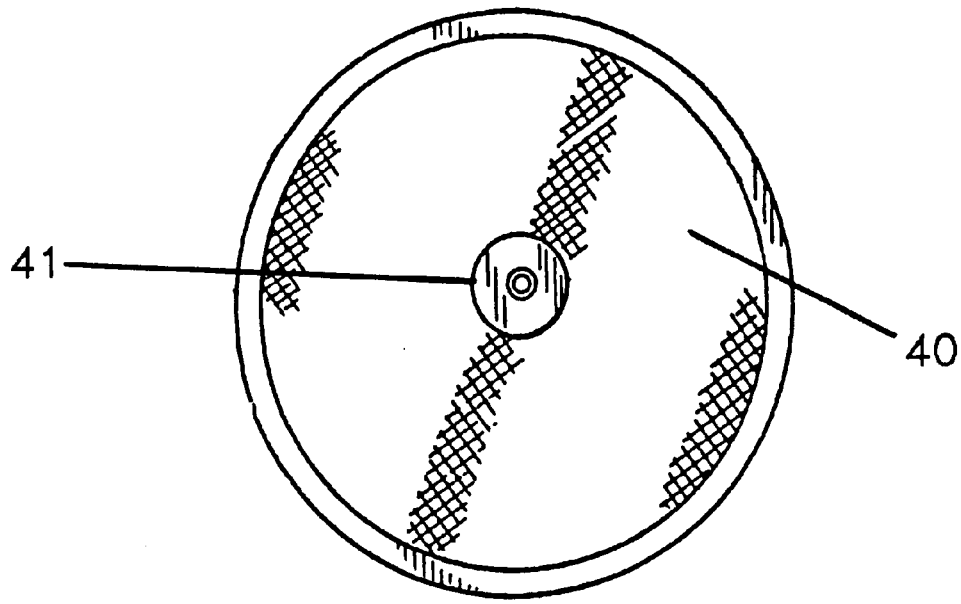
FIG. 3 is a view down the bifurcated duct of FIG. 2, revealing the rear of a direct drive motor adapted to drive an energy wheel.
Figure 4:
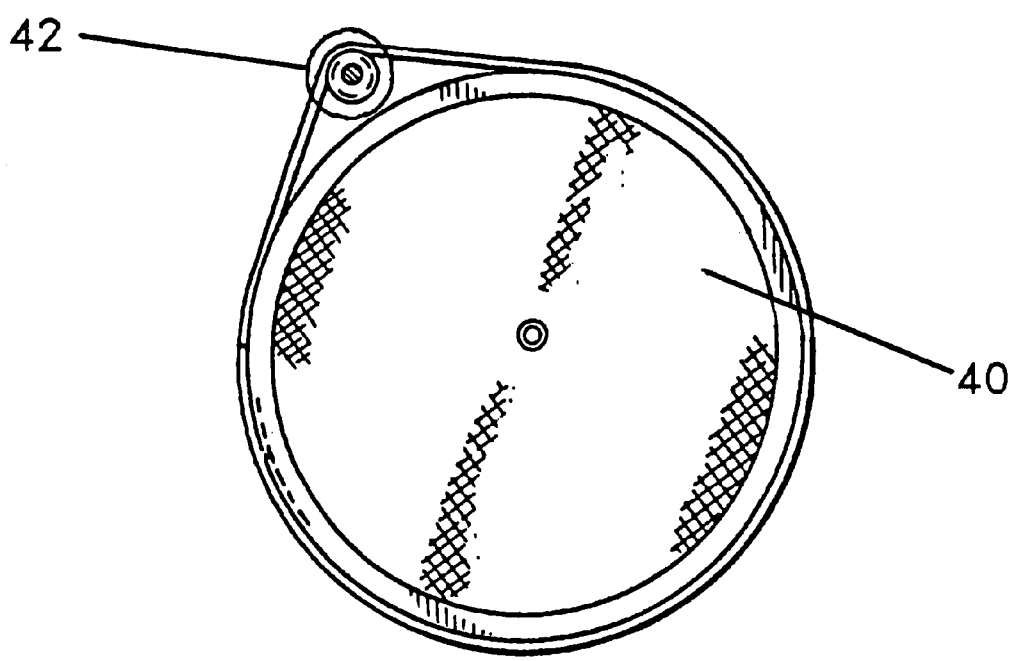
FIG. 4 is a view down the bifurcated duct of FIG. 2, illustrating a belt driven energy wheel with the motor positioned adjacent to the outer edge of the wheel.

The energy wheel is driven by an electric or pneumatic motor 41, as illustrated in FIGS. 3 and 4. The energy wheel may be any one of a variety of rotary wheel heat exchanges such as disclosed by Marron et al. in U.S. Pat. No. 4,093,438 or Coellner in U.S. Pat. No. 4,594,860. Alternatively, the energy wheel can be of the desiccant variety such as disclosed in U.S. Pat. No. 5,542,968. These energy wheels are presented as exemplary only, the invention anticipates the use of any type of thermal energy wheel.

A transducer 50 is positioned in the supply duct, 21, to monitor the velocity of air flow. This is equated to the volume of air per unit time that is exchanged in the room by the room controllers 11A, B or C. The value is processed to provide an indication of the required settings of louvers 12 and 13 to maintain a constant or variable volume air exchange. In sophisticated systems, the louvers are adjusted by electrical or pneumatic motors regulated by the room controller. In alternate embodiments, a damper 14 may be placed in the air supply duct 21 to maintain the required constant or variable volume air exchange. In one such embodiment, louvers 13 in the exhaust duct inlet are adjusted to create a positive pressure within the room. Alternately, constant or variable volume air exchange requirements may be met by placing a damper 15 in the exhaust duct 22. With this placement of the damper, a positive pressure may be maintained in the room. The air velocity measurement is also a factor in determining the angular velocity of the thermal energy wheel.

Each room is provided with a temperature responsive transducer, 16A, B or C, which provides a signal that is processed by the room controller to determine a difference value between the temperature in the room and the target room temperature. The difference value is a control function that is used to regulate the speed of the motor driving the energy wheel 40. In various embodiments, the air velocity through the terminal unit provides another factor in determining the optimum angular velocity of the wheel for meeting environmental requirements for this space serviced by the terminal unit. Temperature sensors 17 and 18, positioned upstream and downstream provide control inputs to the room controller to enable calculation of an angular velocity control function as the difference between the room temperature and the air temperature in the supply duct before or after the thermal energy wheel. In some instances, the temperature difference in the supply duct as measured up stream and downstream is used as an angular velocity control input. Thus the speed of rotation, angular velocity, of the thermal energy wheel is regulated by the room controller as a function of any or all of the following: 1) air velocity through the duct; 2) air volume per unit time through the duct; 3) air temperature in the volume serviced by the terminal unit; 4) air temperature in the supply duct up stream of the thermal energy wheel; and/or 5) air temperature downstream of the thermal energy wheel.

The room controllers may incorporate microprocessor technology to process the foregoing values to arrive at the proper speed control command for the thermal energy wheel motor based on any or all of the foregoing measured functions. Alternately, the room controllers may achieve their goal by dedicated circuitry or through implementation on Application-Specific Integrated Circuits (ASIC).

In a preferred embodiment the motor is a direct drive motor 41 as illustrated in FIG. 2 and for room B in FIG. 1. In an alternate embodiment, the energy wheel 40 is belt driven by a motor 42 positioned adjacent to the wheel as illustrated for room C in FIG. 1. The relative positioning of the two motors may be seen more clearly in FIGS. 3 and 4 wherein FIG. 3 is an end view of the energy wheel driven by the direct drive motor 41 and FIG. 4 is an end view of an energy wheel belt driven by motor 42.

The electrical control cables between the room controllers 11 and their associated energy wheel drive motors and damper and louver positioning motors are illustrated schematically in FIG. 1 along with the connections to various temperature sensing transducers and the air flow velocity transducer. These electrical connections are presented as exemplary only in that various combinations are anticipated within the scope of the invention to meet specific installation requirements. In the embodiments using pneumatic motors, the electrical connections may be used to control valves at the motor sites or the connections illustrated may represent pneumatic lines.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. An air handling system, comprising:
   a terminal unit including an inlet and an outlet duct;
   a thermal energy wheel located in said terminal unit and positioned to rotate simultaneously through said inlet and said outlet ducts;
   means for rotating said thermal energy wheel; and
   means for controlling said means for rotating said thermal energy wheel in response to the temperature demands of the space serviced by said terminal unit.

2. An air handling system as defined by claim 1, wherein said terminal unit includes means for controlling the volume of air per unit time circulated through said space serviced by said terminal unit as provided by said terminal unit.

3. An air handling system as defined by claim 1, wherein said means for controlling said means for rotating said thermal energy wheel comprises a room controller for determining the optimum angular velocity of said thermal energy wheel as a function of temperature differentials between supply air to said terminal unit and the ambient temperature in said space serviced by said terminal unit.

4. An air handling system as defined by claim 3, wherein said room controller provides means for adjusting said determination of said optimum angular velocity as a function of the temperature of the supply air stream passing through said terminal unit as measured up stream of said thermal energy wheel.

5. An air handling system as defined by claim 4, wherein said room controller regulates the volume of air flowing through said space serviced by said terminal unit in response to the velocity of air flowing into said space via said terminal unit.

6. An air handling system as defined by a claim 5, comprising motor driven louvers controlled by said room controller and positioned in said terminal unit.

7. An air handling system as defined by a claim 5, comprising a motor driven damper controlled by said room controller and positioned in said inlet duct.

8. An air handling system as defined by a claim 5, comprising a motor driven damper controlled by said room controller and positioned in said outlet duct.

9. An air handling system, comprising:
   a return air duct;
   a supply air duct;
   a thermal energy wheel positioned for simultaneous rotation through said return air duct and said supply air duct;
   a control means;
   a motor for rotating said thermal energy wheel in response to commands from said control means;
   a room air temperature sensor;
   means for determining air temperature in said supply air duct up stream from said thermal energy wheel;
   means for measuring velocity of air flowing through one of said ducts; and
   said control means comprises means responsive to said room air temperature sensor, said means for determining air temperature in said supply air duct and means for measuring velocity of air flowing through one of said ducts for calculating said motor commands from said control means.

10. An air handling system, comprising:
    a terminal unit including an inlet and an outlet duct;
    means simultaneously rotatable through said inlet and said outlet ducts for transferring thermal energy between said inlet and said outlet ducts as a function of its angular velocity; and
    means for controlling said angular velocity in response to the temperature demands of the volume space serviced by said terminal unit and the temperature of the air supply to said terminal unit via said inlet duct.

11. An air handling system as defined by claim 10, wherein said terminal unit includes means for controlling the volume of air per unit time circulated through said space serviced by said terminal unit as provided by said terminal unit.

12. An air handling system as defined by claim 10, wherein said means for controlling said angular velocity comprises a room controller for determining the optimum angular velocity of said means for transferring thermal energy as a function of temperature differentials between supply air to said terminal unit and the ambient temperature in said space serviced by said terminal unit.

13. An air handling system as defined by claim 12, wherein said room controller provides means for adjusting said determination of said optimum angular velocity as a function of the temperature of the supply air stream passing through said terminal unit as measured up stream of said means for transferring thermal energy.

14. An air handling system as defined by claim 13, wherein said room controller regulates the volume of air flowing through said space serviced by said terminal unit in response to the velocity of air flowing into said space via said terminal unit.

15. An air handling system as defined by a claim 14, comprising motor driven louvers controlled by said room controller and positioned in said terminal unit.

16. An air handling system as defined by a claim 14, comprising a motor driven damper controlled by said room controller and positioned in said inlet duct.

17. An air handling system as defined by a claim 14, comprising a motor driven damper controlled by said room controller and positioned in said outlet duct.

18. An air handling system, comprising:
    a return air duct;
    a supply air duct;
    a means for transferring thermal energy positioned for simultaneous rotation through said return air duct and said supply air duct;
    a control means;
    a motor for rotating said means for transferring thermal energy in response to commands from said control means;
    a room air temperature sensor;
    means for determining air temperature in said supply air duct up stream from said means for transferring thermal energy;
    means for measuring velocity of air flowing through one of said ducts; and
    said control means comprises means responsive to said room air temperature sensor, said means for determining air temperature in said supply air duct and means for measuring velocity of air flowing through one of said ducts for calculating said motor commands from said control means.

* * * * *

UNITED STATES PATENT AND TRADEMARK OFFICE
CERTIFICATE OF CORRECTION

PATENT NO. : 6,196,469 B1  Page 1 of 1
DATED : March 6, 2001
INVENTOR(S) : Frederick J. Pearson It is certified that error appears in the above-identified patent and that said Letters Patent is hereby corrected as shown below:

<u>Title page,</u>
Inventor's correct address should be:
-- 312 W. Moore Street
Southport, NC 28461 --

Signed and Sealed this

Thirtieth Day of October, 2001

Attest:

*Nicholas P. Godici*

NICHOLAS P. GODICI
*Attesting Officer*   *Acting Director of the United States Patent and Trademark Office*